No. 792,897. PATENTED JUNE 20, 1905.
L. A. HILL.
VEHICLE WHEEL.
APPLICATION FILED DEC. 8, 1904.
2 SHEETS—SHEET 1.
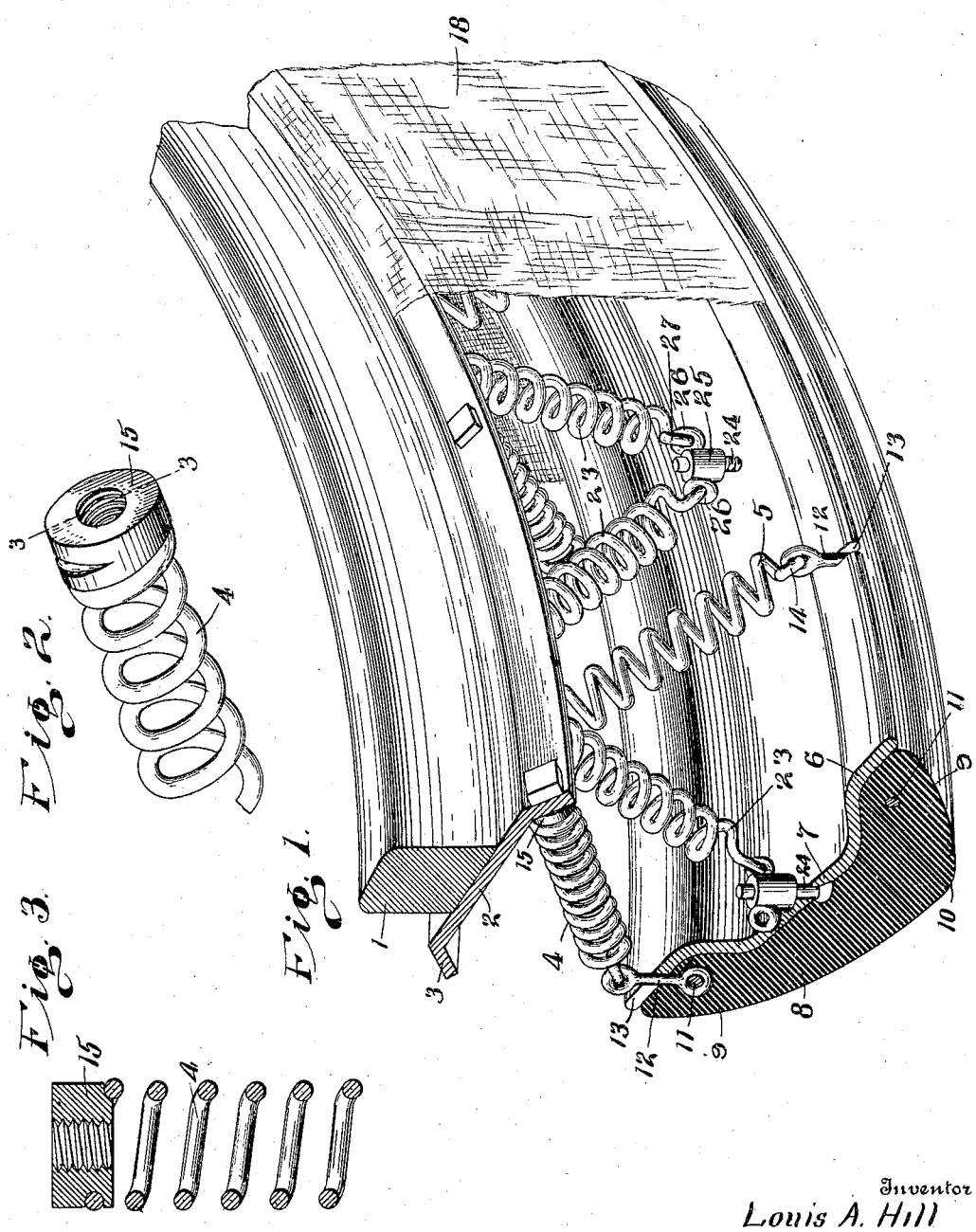
Witnesses
H. A. Robinette
BM. Offutt
Inventor
Louis A. Hill
By
G Ayres  Attorney

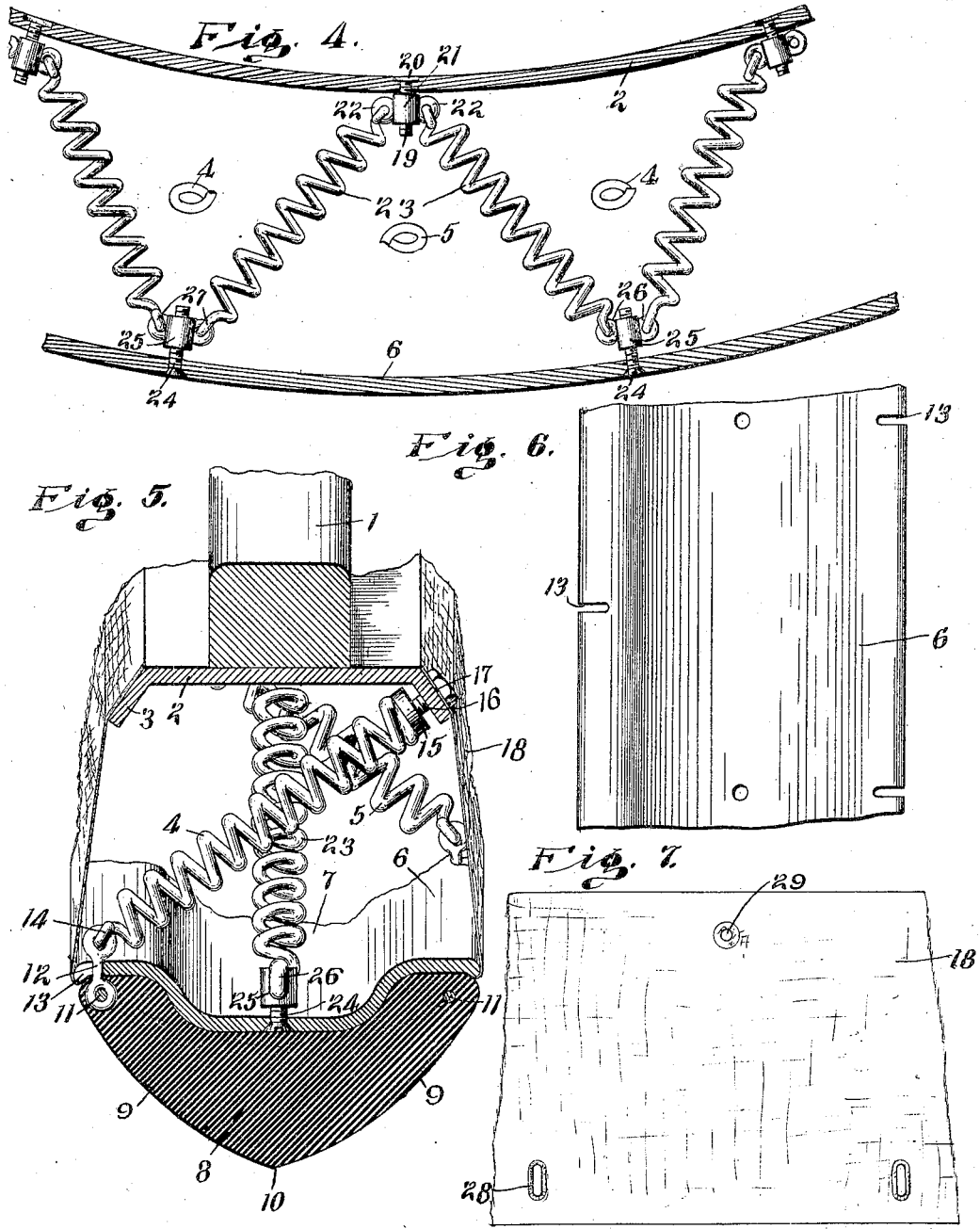

No. 792,897.

Patented June 20, 1905.

UNITED STATES PATENT OFFICE.

LOUIS A. HILL, OF WASHINGTON, DISTRICT OF COLUMBIA.

VEHICLE-WHEEL.

SPECIFICATION forming part of Letters Patent No. 792,897, dated June 20, 1905.

Application filed December 8, 1904. Serial No. 235,998.

*To all whom it may concern:*

Be it known that I, LOUIS A. HILL, a citizen of the United States, residing at Washington, in the District of Columbia, have invented certain new and useful Improvements in Vehicle-Wheels, of which the following is a specification.

My invention relates to an improved vehicle-wheel; and it consists in the parts, constructions, and combinations herein described and claimed.

The objects of my invention are to provide a cushioning-rim for vehicle-wheels which will combine great strength and durability with quickness of recovery and which is provided with a resilient tire constructed to minimize wear on firm well-kept roads, and to present an increased width of tread on soft and sandy roads to provide for the increased traction required thereon.

In the accompanying drawings, forming a part of this application, Figure 1 is a detail perspective view illustrating a preferred embodiment of my invention. Fig. 2 is a detail perspective view, on an enlarged scale, clearly showing the attachment of a threaded head to one of the side springs. Fig. 3 is a sectional view on the line 3 3 of Fig. 2. Fig. 4 is a detail longitudinal sectional view through the plates of the inner and outer wheel-rims, illustrating the construction and arrangement of the medial series of springs. Fig. 5 is an end view of the parts shown in Fig. 1. Fig. 6 is a detail inner view of a portion of the outer wheel-rim, and Fig. 7 is a detail view illustrating the construction of the flexible shields or closures.

Referring to the drawings, 1 indicates the inner rim of a vehicle-wheel, which is secured upon any desired type of hub by the usual form of spokes. A peripheral plate 2, of rigid material, is secured to the rim 1 and provided with offset flanges 3, to which are secured the inner ends of the two side series of springs 4 and 5.

An outer wheel-rim 6 is shown comprising a steel ring provided with a central longitudinal offset or corrugation 7, extending from its outer periphery, for stiffening said rim and engaging a corresponding recess in the inner periphery of a resilient tire 8.

The tire 8 has an inner periphery conforming to the outer periphery of the rim 6 and is provided with an angular tread, (shown formed by two intersecting arcs or other suitable curved surfaces 9 9.) The tire may be provided with the usual strengthening-web of fabric, if desired. In this construction the apex 10 of the tire-tread will be flattened when running on hard roads to maintain a sufficient width of the tread in contact with the road-bed for providing the proper traction contact. This insures a relatively narrow tread, with an accompanying avoidance of unnecessary friction and corresponding reduction in the tendency of the tire to creep on its rim, thus minimizing the most injurious conditions of wear to which existing forms of tires are subjected and greatly increasing the life of the tire. On the other hand, the tire-tread is constructed to sink into soft or sandy roads to prevent skidding and to bring a sufficient width of the tread into engagement with the road-bed to provide for the increased traction necessary on soft roads. This is a very advantageous construction, since it provides a narrow tread on hard road-beds, while insuring a sufficiently-wide tread on soft roads to provide for the increased traction required thereon.

The tire 8 carries two strengthening and clamping wire rings 11 embedded therein, on which are threaded a plurality of links 12, provided with eyes at their free ends and constructed to extend inward through slots 13, arranged in staggered relation on the two edges of the rim 6, as most clearly shown in Fig. 6.

The two side series of springs are shown comprising a plurality of springs 4 and 5, inclined transversely across the wheel-rim, each spring being provided at its outer end with a hook or eye 14 for securing it to the eye of one of the links 12 and at its other end with a threaded head 15, constructed to engage a screw 16, extending through an unthreaded aperture in the rim-flanges 3, opposite to said link. The screws 16 provide a convenient means for adjusting the tension of said springs, and their heads are preferably provided with projecting points 17, constructed to engage the flexible side shields 18 to prevent accidental turning of said adjusting-screws.

A plurality of screws 19 are shown extending through a medial series of unthreaded apertures, arranged in the peripheral plate 2 in approximately radial lines with the springs 5 of one of the side series of springs, each screw 19 being preferably provided with a polygonal head 20, adapted to seat flush in a corresponding recess in the peripheral plate for locking said screw against turning. Nuts 21, threaded on the several screws 19, are provided with oppositely-disposed eyes 22, which constitute securing means for the inner ends of a medial series of springs 23. A similar series of screws 24 are shown extending through countersunk unthreaded apertures arranged in the outer rim 6 in approximately radial lines with the springs 4 of the remaining side series of springs, each screw carrying a nut 25, provided with oppositely-disposed eyes 26, which constitute securing means for the outer ends of the medial series of springs 22. The springs 23 of the medial series are provided with hooks or eyes 27 at each end for engaging the eyes 22 and 26 of the respective nuts 21 and 25, the adjacent springs of the medial series being oppositely inclined longitudinally along the wheel-rim, thus comprising two oppositely-inclined sets of alternate springs, as clearly shown in Fig. 4. In this construction the screws 19 are locked against turning, and each screw 24 provides a convenient means for adjusting the tension of the two oppositely-inclined springs 22, secured thereto, thus furnishing a common means for adjusting the tension of the two oppositely-inclined series of medial springs and insuring the maintenance of an equal tension in the said two series.

Two flexible shields or closures 18, of suitable material, such as canvas or rubber, are shown extending between the rim-plates 3 and 6 for protecting the several series of springs from dirt and injury. As shown in Figs. 5 and 7, the shields 18 are clamped between the rim 6 and tire 8 and extend over the flanges 3, each shield being provided with elongated eyelets 28 adjacent one edge for receiving the links 12 and with eyelets 29 adjacent its other edge to receive the screws 16.

Having thus described my invention, what I claim as new, and desire to secure by Letters Patent, is—

1. In a vehicle-wheel, the combination of a cushioning-rim comprising an inner plate, an outer plate, two series of springs oppositely inclined transversely between said plates, and a medial series of springs consisting of two sets of alternate springs oppositely inclined longitudinally between said plates, substantially as described.

2. In a vehicle-wheel, the combination of a cushioning-rim comprising an inner plate, an outer plate, two series of springs oppositely inclined transversely between said plates, a medial series of springs consisting of two sets of alternate springs oppositely inclined longitudinally between said plates, and a protecting-shield inclosing said several series of springs, substantially as described.

3. In a vehicle-wheel, the combination of a cushioning-rim comprising an inner plate, an outer plate, two series of springs oppositely inclined transversely between said plates, a medial series of springs consisting of two sets of alternate springs oppositely inclined longitudinally between said plates, and means for varying the tension of said several series of springs, substantially as described.

4. In a vehicle-wheel, the combination of a cushioning-rim comprising an inner plate, an outer plate, two series of springs oppositely inclined transversely between said plates, a medial series of springs consisting of two sets of alternate springs oppositely inclined longitudinally between said plates, and means constructed to simultaneously adjust the tension of the two oppositely-inclined springs of each pair of adjacent springs in said medial series, substantially as described.

5. In a vehicle-wheel, the combination of a cushioning-rim comprising an inner plate, an outer plate provided with a projection or corrugation extending around its outer periphery, two series of springs oppositely inclined transversely between said plates, a medial series of springs consisting of two sets of alternate springs oppositely inclined longitudinally between said plates, and a resilient tire surrounding said outer plate and provided on its inner periphery with a recess constructed to engage the projection on the periphery of said outer plate, substantially as described.

6. In a vehicle-wheel, the combination of a cushioning-rim comprising an inner plate, an outer plate provided with a projection or corrugation extending around its outer periphery, two series of springs oppositely inclined transversely between said plates, a medial series of springs consisting of two sets of alternate springs oppositely inclined longitudinally between said plates, and a resilient tire provided with an angular tread and with a recess on its inner periphery constructed to engage the projection on the periphery of said outer plate, substantially as described.

7. In a vehicle-wheel, the combination of a cushioning-rim comprising an inner plate, an outer plate provided with a plurality of slots along each edge, a resilient tire surrounding said outer plate and carrying links in position to extend through said slots, springs connected to said links and extending transversely across said rim to the diagonally opposite edge of said inner plate, and a medial series of springs consisting of two sets of alternate springs oppositely inclined longitudinally between said plates, substantially as described.

8. In a vehicle-wheel, the combination of a cushioning-rim comprising an inner plate provided with an offset flange at each edge, an outer plate provided with a plurality of slots along each edge, a resilient tire surrounding said outer plate and carrying links in position to extend through said slots, springs connected to said links and extending transversely across said rim to the diagonally opposite offset flange, threaded heads secured to said springs, adjusting-screws extending through said offset flanges to engage said threaded heads, and a medial series of springs inclined longitudinally between said plates, substantially as described.

9. In a vehicle-wheel, the combination of a cushioning-rim comprising an inner plate provided with an offset flange at each edge, an outer plate provided with a plurality of slots along each edge, a resilient tire surrounding said outer plate and carrying links in position to extend through said slots, springs connected to said links and extending transversely across said rim to the diagonally opposite offset flange, threaded heads secured to said springs, adjusting-screws extending through said offset flanges to engage said threaded heads, a protecting-shield clamped between the outer plate and tire on each edge and extending to the corresponding offset flange, said shield being provided with openings, or eyelets, to receive said links and adjusting-screws, and a medial series of springs inclined longitudinally between said plates, substantially as described.

In testimony whereof I affix my signature in presence of two witnesses.

LOUIS A. HILL.

Witnesses:
H. RALPH BURTON,
JOHN E. LANSDALE.